United States Patent [19]

Masak

[11] 4,064,422
[45] Dec. 20, 1977

[54] WEIGHT MULTIPLIER FOR USE IN AN ADAPTER PROCESSOR

[75] Inventor: Raymond J. Masak, E. Northport, N.Y.

[73] Assignee: The United States of America as represented by the Secretary of the Air Force, Washington, D.C.

[21] Appl. No.: 719,313

[22] Filed: Aug. 31, 1976

[51] Int. Cl.² .......................... H04B 3/04; G06G 7/16
[52] U.S. Cl. ...................................... 364/841; 333/18; 364/825
[58] Field of Search ............... 235/194, 193, 156, 152; 333/11, 18, 28 R, 70 T; 328/167; 331/38, 41, 46, 182, 183; 325/42, 65

[56] References Cited

U.S. PATENT DOCUMENTS

| | | | |
|---|---|---|---|
| 3,081,434 | 3/1963 | Sandberg | 333/70 T |
| 3,375,473 | 3/1968 | Lucky | 333/18 |
| 3,521,041 | 7/1970 | Van Blerkom et al. | 235/156 |
| 3,597,541 | 8/1971 | Proakis | 325/42 UX |
| 3,758,881 | 9/1973 | Rummler | 333/18 X |

Primary Examiner—Joseph F. Ruggiero
Attorney, Agent, or Firm—Joseph E. Rusz; George Fine

[57] ABSTRACT

A weight multiplier for use in an adaptive processor. The input signal from a tapped delay line is split in a 3 dB hybrid into two equal level and equal phase signals. Each signal is fed to a mixer together with a signal performing the function of an oscillator signal. Output signals from the mixer are subtracted in a broadband hybrid. The result of this subtractor is then fed to a summer to supply a loop feedback signal.

3 Claims, 2 Drawing Figures

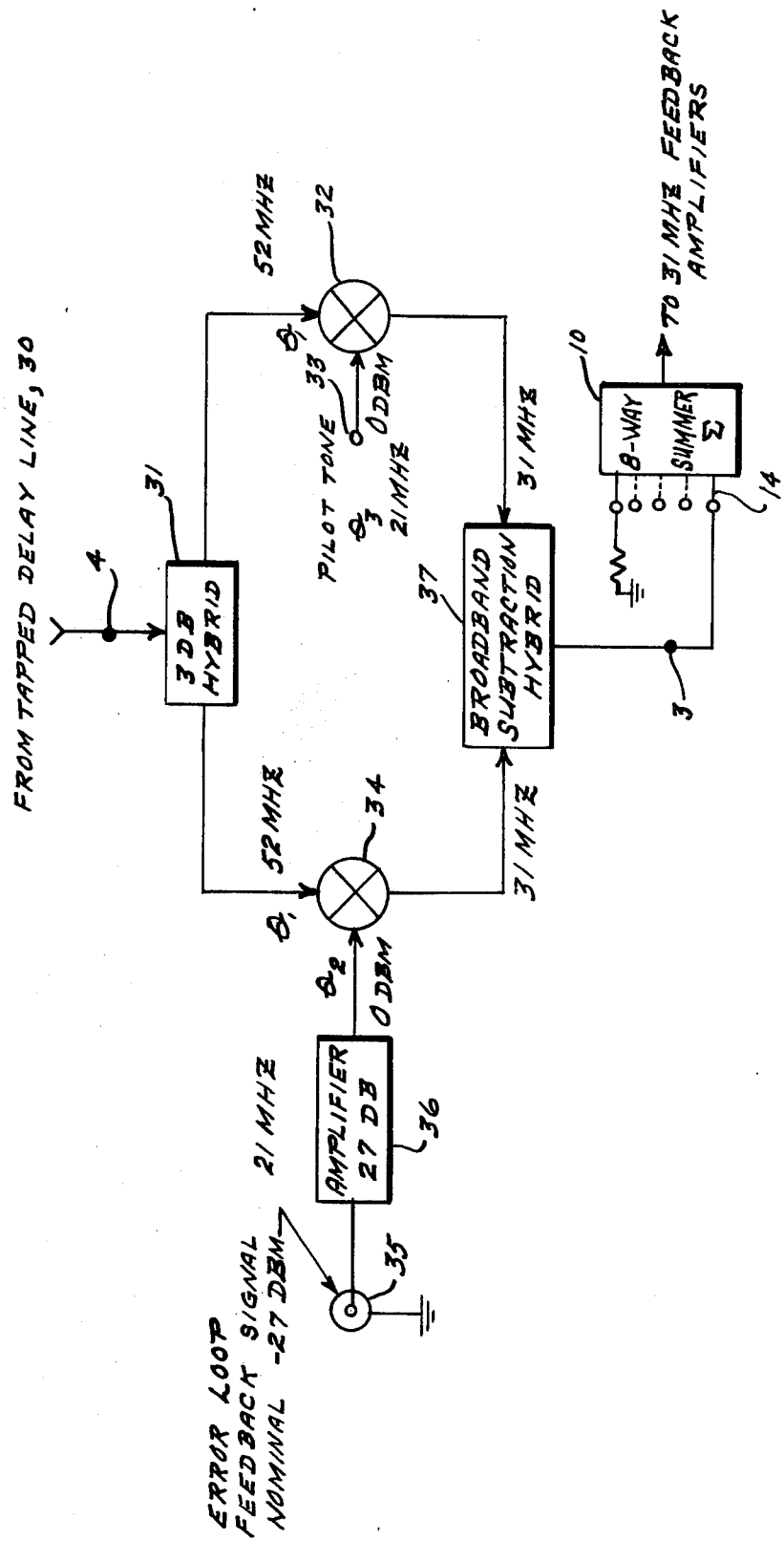

WEIGHT MULTIPLIER FOR USE IN AN ADAPTER PROCESSOR

STATEMENT OF GOVERNMENT INTEREST

The invention described herein may be manufactured and used by or for the Government for governmental purposes without the payment of any royalty thereon.

BACKGROUND OF THE INVENTION

In the prior art adaptive processors, there were utilized weight multipliers. The conventional weight multiplier accepts an input signal and multiplies it by a signal supplied by a subtractor. One problem in these weight multipliers is that the absolute value of the constant changes with the variation in input signal amplitudes. The improved weight multiplier of the present invention maintains this constant at a desired level.

SUMMARY OF THE INVENTION

A weight multiplier for use in an adaptive processor is provided. The input signal comes from a port of a tapped delay line and is split in a 3 db hybrid generating two equal level and equal phased signals. Each of these signals is demodulated down to an IF center frequency. In a first mixer the signal performing the function of the local oscillator is a high level version of a CW pilot tone. In a second mixer the local oscillator function is performed by a signal which is an amplified version of a loop error signal. Both outputs of the mixers are subtracted in a broadband hybrid. The result of the subtraction is fed to a standard 8-way summer generating the loop feedback signal. The aforementioned tapped delay line provides eight input signals, one for each weight multiplier in the adaptive processor and the 8-way summer receives seven other input signals similar to the aforesaid summer input signal from the broadband hybrid.

DESCRIPTION OF THE DRAWINGS

FIG. 2 shows in block diagram form the preferred embodiment of the improved weight multiplier to be used in the adaptive processor.

DETAILED DESCRIPTION OF THE PREFERRED EMBODIMENT

Figure 1:
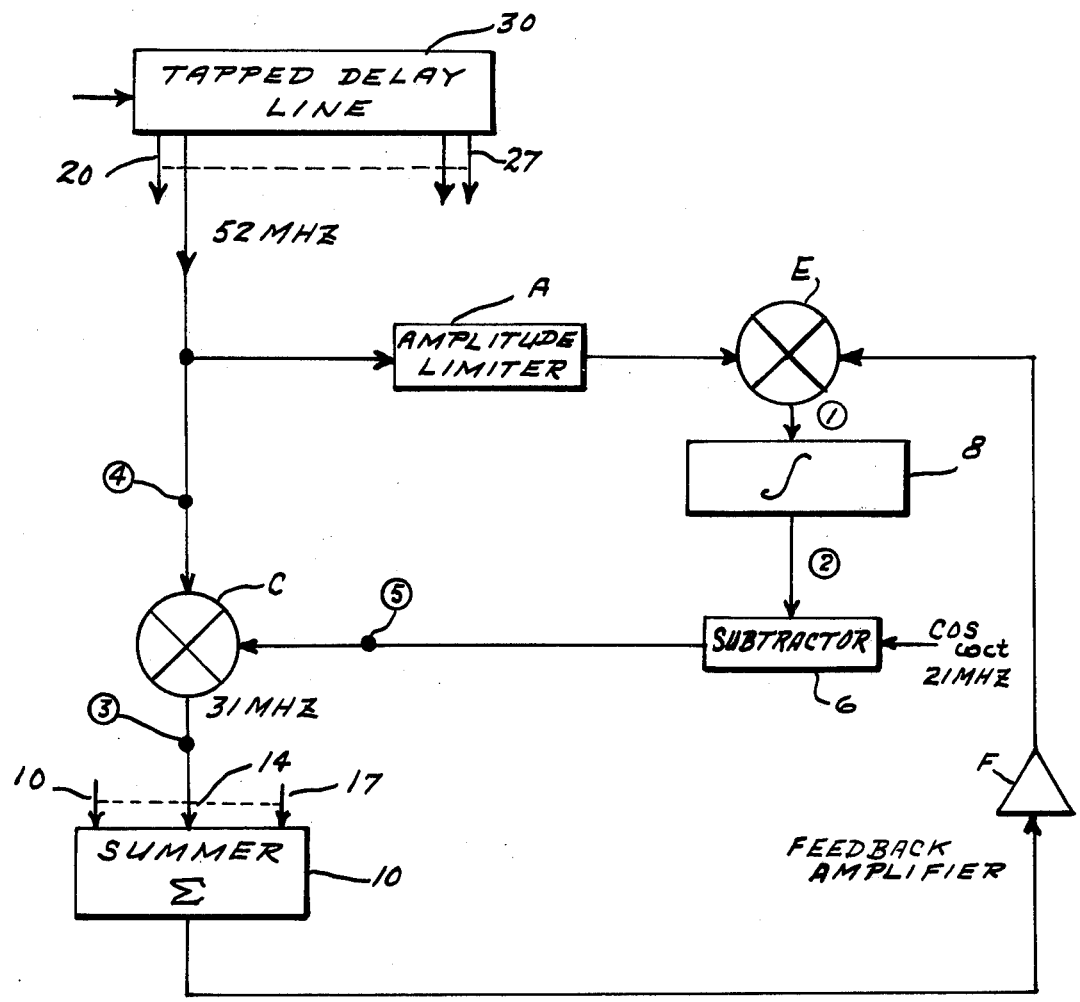
FIG. 1 shows the prior art weight multiplier for use in the adaptive processor.

FIG. 1 shows the prior art weight multiplier utilized in the adaptive processor. Between points 3 and 4 is conventional weight multiplier C which accepts the input signal from tapped delay line 30 having eight outputs 20-27. Weight multiplier C multiplies the input signal by both a constant (K) and the signal supplied by subtractor 6. The absolute value of the constant changes with the variation in input signal amplitudes. To maintain this constant at the desired value the weight multiplier of FIG. 2 is inserted at points 3 and 4 of FIG. 1 in place of weight multiplier C.

Now referring in detail to FIG. 2, the input signal from tapped delay line 30 is split in 3 dB hybrid 31, generating two equal level and equal phased signals. Each of these signals $\theta$ is demodulated down from 52 MHz to an IF center frequency of 31 MHz. In mixer 32 the signal performing the function of the local oscillator is a high level version of a CW pilot tone at 21 MHz from input 33 and shown as signal $\theta_3$. In mixer 34 the local oscillator function is performed by a 21 MHz signal from input 35 which is an amplified version of the loop error signal of the adaptive processor of FIG. 1. The signal from input 35 is passed through amplifier 36 to mixer 34. The input to mixer 34 is shown as signal $\theta_2$. Both outputs from mixers 32 and 34 are subtracted in broadband hybrid 37. The result of this subtraction is then fed by way of point 3 to input 14 of standard 8-way summer 10 (also shown in FIG. 1) generating the loop feedback signal.

Both 52 MHz signal inputs to the mixers are broadband and span a rather wide dynamic range. The selected lower sideband in the output of mixer 32 has a level which follows the level of the input 52 MHz signal. Furthermore, because the recommended high level of 0 dBm is used as the local oscillator at 21 MHz, the lower sideband contains all the phase modulation present in the difference of the phase modulation of the 52 MHz signal and the 21 MHz signal. A similar preservation of phase modulation information in the lower sideband is also present in the output of mixer 34. The loop error signal which effectively generates the loop local oscillator drive from mixer 34 contains phase modulation information which is necessary to the operation of a given loop. However, the level of the loop error signal stays approximately constant at −27 dBm for certain high level CW tap inputs. Therefore, an amplifier with axis gain of approximately 27 dBm can bring up the error signal to a level of 0 dBm. The relative constancy of this level insures that the phase modulation information will be preserved in the output.

It is noted that 8-way summer 10 shown both in FIGS. 1 and 2 receives 8 input signals for summing purposes. A representative input signal is shown for input 14. FIG. 1 illustrates one configuration, actually eight are provided and thus there are eight input signals to summer 10. It is emphasized that the invention is an improved weight multiplier as shown between points 3 and 4 of FIG. 2 for use in the adaptive processor.

What is claimed is:

1. In an adaptive processor, a weight multiplier being comprised of a hybrid receiving an input signal of predetermined frequency and phase, said hybrid splitting said input signal into first and second signals of equal level and equal phase, first and second mixers receiving said first and second signals, respectively, said first mixer simultaneously receiving a CW pilot tone signal of a first preselected frequency, said CW pilot tone signal performing the function of a local oscillator at a high level, said second mixer simultaneously receiving for local oscillator purposes a signal being an amplified version of a loop error signal in said adaptive processor, a broadband subtraction hybrid receiving the outputs from said first and second mixers and providing a resultant signal therefrom for use in said adaptive processor.

2. In an adaptive processor, a weight multiplier as described in claim 1 further including an amplifier of predetermined gain passing said signal for local oscillator purposes prior to application to said second mixer.

3. In an adaptive processor, a weight multiplier as described in claim 2 wherein said hybrid for splitting an input signal consists of a 3 dB hybrid.

* * * * *